(12) United States Patent
Rohden

(10) Patent No.: US 9,567,048 B2
(45) Date of Patent: Feb. 14, 2017

(54) MAGNUS-ROTOR

(75) Inventor: Rolf Rohden, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 837 days.

(21) Appl. No.: 13/821,533

(22) PCT Filed: Sep. 9, 2011

(86) PCT No.: PCT/EP2011/065623
§ 371 (c)(1),
(2), (4) Date: May 20, 2013

(87) PCT Pub. No.: WO2012/034935
PCT Pub. Date: Mar. 22, 2012

(65) Prior Publication Data
US 2013/0230399 A1    Sep. 5, 2013

(30) Foreign Application Priority Data

Sep. 16, 2010    (DE) .................. 10 2010 040 911

(51) Int. Cl.
*B63H 9/02*    (2006.01)
*B63H 1/14*    (2006.01)

(52) U.S. Cl.
CPC ...... *B63H 1/14* (2013.01); *B63H 9/02* (2013.01); *Y02T 70/58* (2013.01)

(58) Field of Classification Search
CPC ........ B63H 1/14; B63H 9/02; F05B 2240/201; F05B 2260/20; F05B 2260/205; F05B 2260/24; Y02T 70/58
USPC .................................................. 416/4, 93 R
See application file for complete search history.

(56) References Cited

U.S. PATENT DOCUMENTS

| 1,674,169 A | 6/1928 | Flettner |
| 1,697,574 A | 1/1929 | Savonius |
| 2,713,392 A | 5/1950 | Von Karman et al. |
| 4,228,563 A | 10/1980 | Weber |
| 4,366,386 A | 12/1982 | Hanson |
| 4,398,895 A | 8/1983 | Asker |

(Continued)

FOREIGN PATENT DOCUMENTS

| AT | 110303 B | 8/1928 |
| BE | 895044 C | 3/1983 |

(Continued)

OTHER PUBLICATIONS

"Hybrid rotors for wind propulsion," *Marine Engineers Review*:54-55, London, GB, Sep. 1, 1991.

(Continued)

*Primary Examiner* — Eric Keasel
*Assistant Examiner* — Jason Davis
(74) *Attorney, Agent, or Firm* — Seed Intellectual Property Law Group LLP

(57) ABSTRACT

The present invention concerns a Magnus rotor comprising a carrier, and a rotary body mounted rotatably to the carrier, as well as a drive device for driving the rotary body. The carrier has at least one opening which connects an internal space in the carrier with an external space in such a way that air can pass through between those two spaces. The invention further concerns a method of cooling elements of a Magnus rotor, a method of heating a rotary body of a Magnus rotor and a ship.

15 Claims, 5 Drawing Sheets

(56) References Cited

U.S. PATENT DOCUMENTS

| | | | |
|---|---|---|---|
| 4,401,284 A | 8/1983 | Austin | |
| 4,446,379 A | 5/1984 | Borg et al. | |
| 4,582,013 A | 4/1986 | Holland, Jr. | |
| 4,602,584 A | 7/1986 | North et al. | |
| 4,630,997 A | 12/1986 | Cousteau et al. | |
| 5,176,581 A | 1/1993 | Kumm | |
| 6,830,436 B2 | 12/2004 | Shibata et al. | |
| 6,848,382 B1 | 2/2005 | Bekker | |
| 7,217,091 B2 | 5/2007 | LeMieux | |
| 8,047,774 B2 | 11/2011 | Bagepalli | |
| 8,230,798 B2 | 7/2012 | Rohden et al. | |
| 8,322,985 B2 * | 12/2012 | Kawai | F03D 1/06 415/175 |
| 2009/0217851 A1 | 9/2009 | Kind | |
| 2009/0241820 A1 | 10/2009 | Rohden | |
| 2011/0232555 A1 | 9/2011 | Levander | |
| 2013/0243593 A1 | 9/2013 | Rohden | |
| 2014/0137781 A1 | 5/2014 | Rohden | |

FOREIGN PATENT DOCUMENTS

| | | |
|---|---|---|
| CA | 2 652 284 A1 | 12/2007 |
| CN | 101198516 A | 6/2008 |
| CN | 101454197 A | 6/2009 |
| DE | 422057 C | 11/1925 |
| DE | 558 426 C | 8/1932 |
| DE | 24 30 630 A | 4/1976 |
| DE | 24 47 861 A1 | 4/1976 |
| DE | 27 47 914 A1 | 5/1979 |
| DE | 29 08 159 A1 | 9/1979 |
| DE | 243 251 A1 | 12/1985 |
| DE | 692 18 428 T2 | 6/1991 |
| DE | 41 01 238 A1 | 7/1992 |
| DE | 29 818 774 U1 | 3/1999 |
| DE | 199 52 460 A1 | 5/2001 |
| DE | 101 02 740 A1 | 8/2002 |
| DE | 103 34 481 A1 | 3/2005 |
| DE | 10 2005 028 447 A1 | 12/2006 |
| DE | 10 2006 025 732 B4 | 5/2010 |
| EP | 0 055 638 A1 | 7/1982 |
| GB | 2 007 819 A | 5/1979 |
| GB | 2 187 154 A | 9/1987 |
| GB | 2 332 891 A | 7/1999 |
| JP | 56-57470 A | 5/1981 |
| JP | 57-55292 A | 4/1982 |
| JP | 63-195998 U | 12/1988 |
| JP | 2005-256606 A | 9/2005 |
| WO | 01/33076 A1 | 5/2001 |
| WO | 2006/133950 A2 | 12/2006 |

OTHER PUBLICATIONS

International Search Report, dated Apr. 21, 2008, for corresponding International Application No. PCT/EP2007/004816, 22 pages.
Risch et al., "Windschiffe," *VEB Verlag Technik*, Berlin, 1998, 5 pages.
Rizzo "The Flettner Rotor Ship in the Light of the Kutta-Joukowski Theory and of the Experimental Results," *National Advisory Committee for Aeronautics, Technical Note 228*, Washington, Oct. 1925, 29 pages.
Shipbuilding, "Rotosail to enter commercial service on 445 dwt ship," *Schiff & Hafen 7*, Hamburg Deutschland, Jul. 1985, 2 pages.
Wagner, Claus D.: Die Segelmaschine. Hamburg. Ernst Kabel Verlag GmbH, 1991, pp. 85, 156-159.—ISBN 3-8225-0158-1.

* cited by examiner

MAGNUS-ROTOR

BACKGROUND

Technical Field

The invention concerns a Magnus rotor. The invention further concerns a method of cooling elements of a Magnus rotor, a method of heating a rotary body of a Magnus rotor and a ship.

Description of the Related Art

Magnus rotors are also referred to as Flettner rotors or sailing rotors.

Such rotors are known in the state of the art. They are also known by the term Flettner rotors in particular as ship drives and equipping ships with such a sailing, Flettner or Magnus rotor is described in the book 'The Sailing Machine' by Klaus D Wagner, Ernst Kabel Verlag GmbH, Hamburg, 1991.

Such ship drives, with the co-operation of their own rotation and the wind flowing around them, generate a forward thrust force for driving the ship. In particular Magnus rotors can be used as ship drives everywhere that there are sufficient winds.

The Magnus rotors are substantially in the form of cylindrical hollow bodies so that the drive device, carrier elements and similar can be arranged in the interior of the Magnus rotor. One possible form of arrangement in that respect is for all drive elements and similar assemblies to be arranged in an inner stationary cylinder, and for the rotating cylinder to be mounted in a central or upper portion on the inner cylinder.

The elements and assemblies arranged in the interior can heat up in operation. That is the case in particular with the drive device. In order to ensure optimum operation however it is necessary to cool the elements and the assemblies.

BRIEF SUMMARY

According to one embodiment of the invention there is provided a Magnus rotor comprising a carrier, a rotary body mounted rotatably to the carrier, and a drive device for driving the rotary body, wherein the carrier has at least one opening which connects an internal space in the carrier with an external space in such a way that air can pass through between those two spaces.

According to one or more embodiments of the invention the carrier has openings through which air can enter from an external space in relation to the carrier, into an internal space in the carrier, or air can issue from an internal space in the carrier into an external space in relation to the carrier. That is advantageous in particular as a separate cooling device does not have to be provided for each element (for example the drive device) within the Magnus rotor. It is sufficient for the openings to be appropriately arranged so that a cooling air flow can occur. In that respect it is also advantageous if the openings can be selectively and/or at least partially closed so that air can respectively be passed in a suitable fashion through the internal space. Thus it is easily possible for the drive device and further elements within the Magnus rotor to be cooled and for an operating temperature which is as optimum as possible to be guaranteed. Such cooling is in addition substantially less expensive and involves less maintenance than a separate water or oil cooling arrangement. In addition such a kind of cooling does not require any additional energy as no additional machines or assemblies have to be operated. Advantageously, both the carrier and also the rotary body are of a substantially cylindrical configuration.

In a preferred embodiment the carrier is arranged substantially within the rotary body and the drive device is arranged substantially within the carrier.

Insofar as the carrier is arranged in the interior of the Magnus rotor, it is possible for the rotor to be supported in a central portion. If the upright rotor is supported solely in a foot region, the prevailing forces are not advantageously carried away. In such an arrangement the carrier is substantially completely enclosed by the rotary body. In such an embodiment the external space is substantially an intermediate space between the carrier and the rotary body. The at least one opening now permits air exchange between the internal space in the carrier and the intermediate space. That is particularly advantageous as an air flow is caused in the intermediate space by the rotation of the rotary body and the air thus easily passes through the at least one opening into the internal space in the carrier. In addition it is advantageous if the flow is correspondingly greater, the correspondingly faster the rotary body rotates, and therefore the loading of the drive in the interior of the carrier is correspondingly higher. In that way the cooling effect can be even more easily adapted to the loading of the drive.

In a further preferred embodiment the carrier has an upper portion and a lower portion and each portion has at least one opening.

Thus in accordance with the invention a flow is produced in the carrier from a lower portion towards an upper portion. The terms lower and upper relate in that respect to an upright position of the Magnus rotor, as it is generally operated. Arranging the openings in that way is particularly advantageous as heated air always rises upwardly and can thus easily issue from the internal space in the carrier, in an upper portion. It is also advantageous to arrange a plurality of openings in the carrier. In that way, air passes through a plurality of openings into the carrier and issues again through a plurality of openings. In that respect it is advantageous for individual openings to be selectively closed so that the flow within the carrier is adjustable.

In an embodiment the flowing air forms a circuit. Firstly, by virtue of the flow in the intermediate space, the air enters into the carrier through an opening in the lower portion. Here, it is heated by convection cooling of the drive device or other elements. The heated air issues through an opening in the upper portion into the intermediate space. Here the air is cooled again and as a consequence thereof drops down within the intermediate spaces in order to pass into the carrier again through the opening arranged in the lower portion. In this embodiment only the air within the Magnus rotor is used. The rotary body is so arranged that substantially no air can penetrate from outside the rotary body, inwardly thereof. Alternatively the rotary body has openings so that fresh air always passes into the internal space (or intermediate space).

In a further preferred embodiment the upper portion is at least partially conically shaped and the at least one opening is arranged in the conically shaped portion.

The fact that the at least one opening disposed in the upper portion is disposed in a conical portion further advantageously influences the discharge of air. Furthermore the conical configuration has structural and force-carrying advantages in regard to supporting the rotary body on the tip of the cone.

In a further preferred embodiment a louvre grill is arranged in the region of the at least one opening. The arrangement of a louvre grill is advantageous both in a region of an opening which functions as an air intake and also in a region of an opening which functions as an air outlet. If a louvre grill is arranged at an air intake that makes it impossible to pass therethrough. If the Magnus rotor should be in operation and therefore the rotary body is rotating, it is for example dangerous for personnel to reach the rotary body by passing through the opening. In addition the flow is advantageously influenced by the louvre grill and the cooling performance is thus improved. The louvre grill is advantageously to be designed to be removable. When the Magnus rotor is not in operation the openings can be used for maintenance purposes.

If the louvre grill is arranged in a region of an outlet opening, in particular an outlet opening which is provided in the conical portion of the carrier, it serves on the one hand to cool the carrier while on the other hand the flow of the issuing air is advantageously influenced so that it quickly cools down and can pass into the carrier again.

In a further preferred embodiment the drive device is an electric drive with further peripheral devices and the drive device and peripheral devices are arranged substantially within the carrier.

The fact that the drive device of the Magnus rotor is in the form of an electric drive substantially simplifies operation and control of the Magnus rotor. Thus for example no transmission is necessary for changing the direction of rotation. It will be noted however that an electric drive requires further peripheral devices. That includes for example rectifiers like inverters, control devices and similar. Further peripheral devices which are independent of the drive can also be arranged within the carrier. That includes for example heating or cooling assemblies (for example for oil or water cooling systems), braking devices, measuring instruments and similar. The fact that cooling of all those elements is effected by way of an air flow within the carrier particularly advantageously makes use of the flow.

In a further preferred embodiment the drive device and/or the peripheral devices have cooling ribs.

Advantageously the cooling ribs are so arranged on the drive and/or the peripheral devices that the cooling action of the air flow is advantageously used in the interior of the carrier. For example the cooling ribs can be arranged on the housings of the drive and/or of the peripheral devices.

In a further preferred embodiment the rotary body is mounted rotatably by means of a connecting element on the carrier and the connecting element has at least one opening connecting an intermediate space between the carrier, rotary body and connecting element to a space above the connecting element in such a way that air can pass through between those two spaces.

If the rotary body is supported in a central or upper portion on the carrier, a connecting element is required for that purpose. Here it is advantageous if the connecting element, like the carrier, has openings, so that the external space in relation to the carrier is increased in size and the cooling action of the air is thus advantageously influenced.

In a further preferred embodiment the rotary body has cooling ribs on an inner portion.

That advantageously influences cooling of the air in the external space or intermediate space. Cooling of the air is substantially effected by means of convection at the inside surface of the rotary body. The fact that the rotary body has cooling ribs means that the surface area available for convection is increased in size and thus convection is positively influenced. In an alternative embodiment it is also advantageous if the rotary body has openings so that air exchange takes place with an external space in relation to the rotary body. That is advantageous if the heated air can no longer be sufficiently cooled down within the rotary body so that it is advantageous to mix it with fresh air.

In a further preferred embodiment the Magnus rotor has means for producing a flow through the at least one opening.

The fact that such means are provided means that the flow within the carrier is further advantageously influenced. Such means include for example simple covers, outlets in the form of a nozzle, pipe extensions, air guide plates and the like, so that the air flows into the internal space in a special way. Those means further include fans or propellers. Thus it is possible for heated air to be sucked out of the internal space in the carrier or for air to be conveyed in specifically targeted fashion into the internal space in the carrier.

In a further alternative embodiment the cold air is conveyed out of the intermediate space by way of a means for producing a flow through an upper opening into the carrier. In that way it is possible for volume flows of cold air to be passed into an upper portion of the carrier in specifically targeted fashion.

In addition the object of the invention is attained by a method of cooling elements of a Magnus rotor, wherein the Magnus rotor has a carrier and a rotary body mounted rotatably at the carrier, and wherein the carrier has at least two openings which connect an internal space of the carrier to an external space in such a way that air can pass through between those two spaces, including the steps:

introducing air through an opening arranged in a first, in particular lower portion, into the internal space of the carrier, heating the air by convection cooling of the elements in the internal space of the carrier, issuing the heated air through an opening arranged in a second, in particular upper portion, into an external space, and cooling the heated air in the external space.

That method advantageously describes cooling of the elements arranged within the Magnus rotor. Those elements can be for example the drive motor or a mounting for the rotor. The term can also include further elements which are arranged within the rotor and which require cooling. Cool air passes through the one of the at least two openings into the internal space in the carrier and there flows to the elements to be cooled. While the air is flowing around the elements, a heat exchange process then takes place: the elements are cooled while the air flowing therearound is heated. That heated air then issues through the second of the at least two openings and is cooled down again outside the carrier. Subsequently the air can pass to the first opening again and can again pass into the internal space. In that embodiment the method makes use of a substantially closed air circuit.

In an alternative embodiment of the method fresh air is additionally passed into the Magnus rotor or enters the Magnus rotor. That is advantageous if the air of the substantially closed air circuit should not be sufficient to provide a satisfactory cooling action.

In addition the object of the invention is attained by a method of heating a rotary body of a Magnus rotor, wherein the Magnus rotor has a carrier and a rotary body mounted rotatably to the carrier, and wherein the carrier has at least one opening which connects an internal space of the carrier to at least one external space in such a way that air can pass through between those two spaces, including the steps:

heating the air by convection cooling of elements in the internal space of the carrier, issuing the heated air from the internal space into at least one external space, and heating the rotary body by means of the heated air.

The air is heated by convection cooling of elements such as for example drive devices, rectifiers, control arrangements, heat exchangers and so forth. The heated air is passed through at least one opening in the carrier into an external space. The external space is preferably an intermediate space between the carrier and the rotary body. There the air heats the rotary body by means of convection, with the air being cooled down again. Heating of the rotary body is advantageous as a ship which has a Magnus rotor can be used in different climatic zones. Depending on the respective weather conditions, ice can be formed on the rotary body. Thus it is advantageous for the heated air to be passed into the rotary body as the rotary body is heated from the interior by that heated air and as a result the ice which clings to its outside wall is removed by thawing. Such thawing means that an iced-up Magnus rotor can be rendered operable again as a Magnus rotor, to the rotary body of which ice clings from the outside, should not be operated. Thus, the ice clinging thereto can represent a considerable additional mass which would have to be additionally driven and which reduces the efficiency of the Magnus rotor drive. Furthermore the ice can cling asymmetrically to the outside wall and as a result can produce an unbalance which can adversely affect operation or make it impossible. There is also the risk that, in operation, ice clinging to the rotor is broken away from the outside wall of the Magnus rotor and is flung away therefrom, whereby the surrounding area can be put at risk by the pieces of ice which are thrown off. For safety reasons and to restore the Magnus rotor operation, it is therefore necessary to provide a possible way of being able to thaw an iced Magnus rotor as quickly as possible.

In addition the object is attained by a ship comprising at least one Magnus rotor, wherein the Magnus rotor is designed in accordance with one of the above-described preferred embodiments.

BRIEF DESCRIPTION OF THE SEVERAL VIEWS OF THE DRAWINGS

The invention is described hereinafter by means of an embodiment by way of example with reference to the accompanying drawings in which.

DETAILED DESCRIPTION

Figure 1:
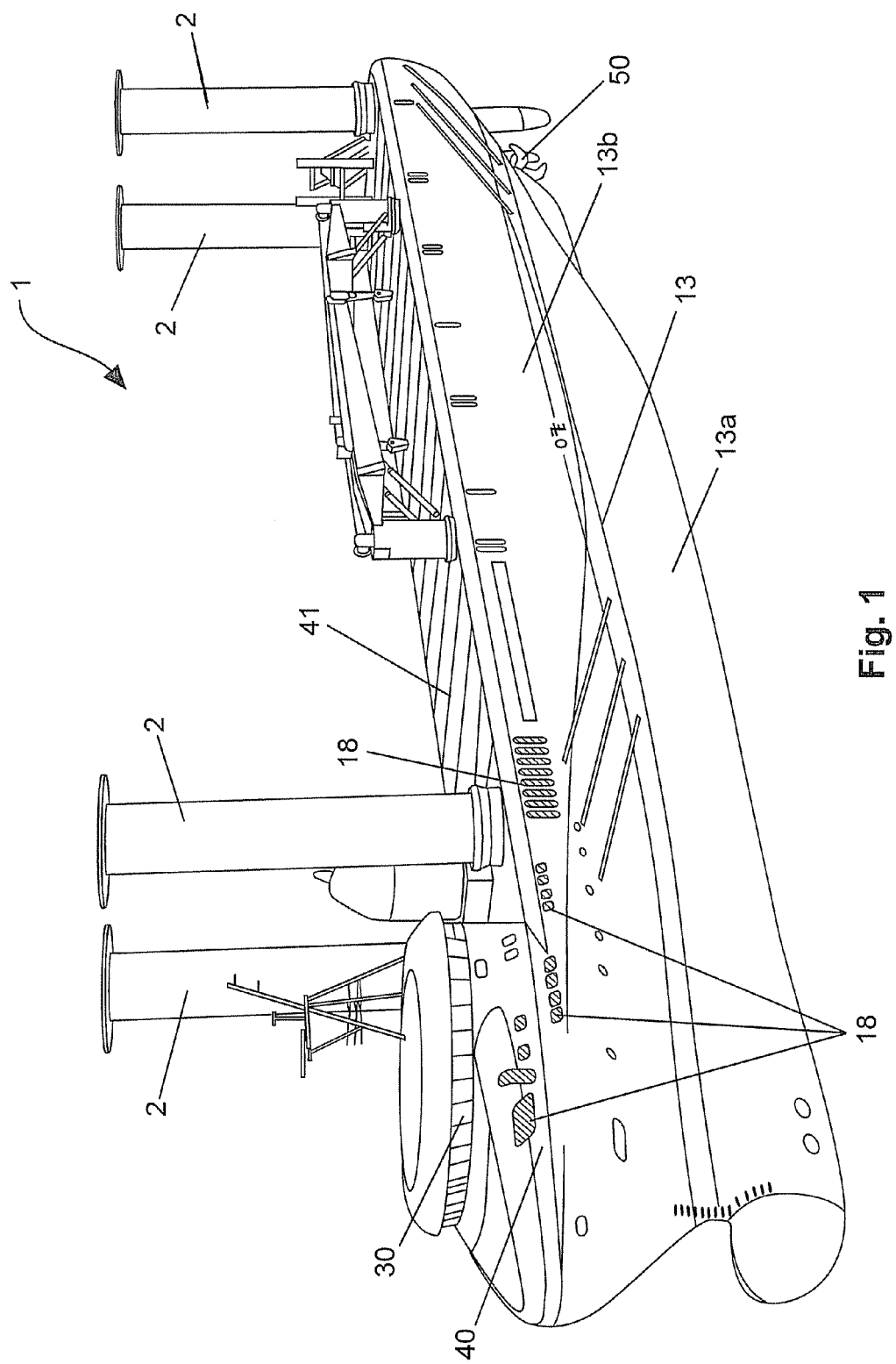
FIG. 1 shows a perspective view of a ship having a plurality of Magnus rotors.

In FIG. 1 the ship 1 has a plurality of Magnus rotors 2. The ship 1 further has a hull 13 comprising an underwater region 13a and an above-water region 13b. In addition the ship 1 has four Magnus rotors or Flettner rotors 2 arranged at the four corners of the hull. In this case the four Magnus rotors 2 represent wind-operated drives for the ship 1 according to the invention. The ship 1 has a deckhouse 40 arranged in the forecastle and having a bridge 30. Underwater the ship 1 has a screw or propeller 50. Window and ventilation openings 18 are also arranged in the hull 13. The ship 1 can also have transverse thruster rudders for improved maneuverability, wherein preferably one is provided at the stern and one to two transverse thruster rudders are provided at the bow. Preferably those transverse thruster rudders are electrically driven. The accommodation quarters, galleys, provision store rooms, messes and so forth are arranged in the deckhouse 40. In this case the deckhouse 40, the bridge 30 and all superstructures above the weather deck 41 are of an aerodynamic shape to reduce wind resistance. That is achieved in particular by substantially avoiding sharp edges and sharp-edged structures. To minimize the wind resistance and to achieve an aerodynamic shape, as few superstructures as possible are provided.

Figure 2:
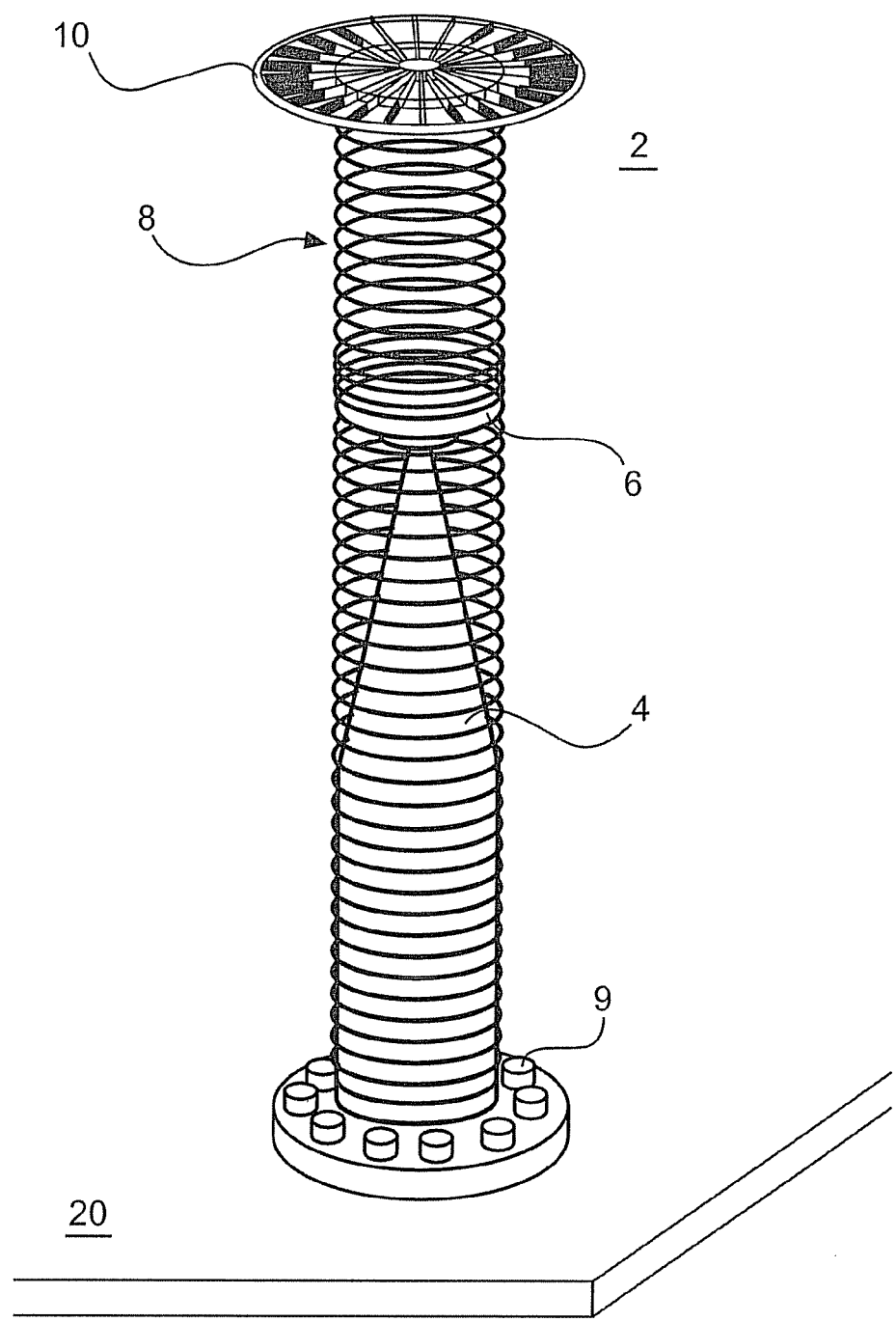
FIG. 2 shows a diagrammatic perspective view of a Magnus rotor.
Figure 3:
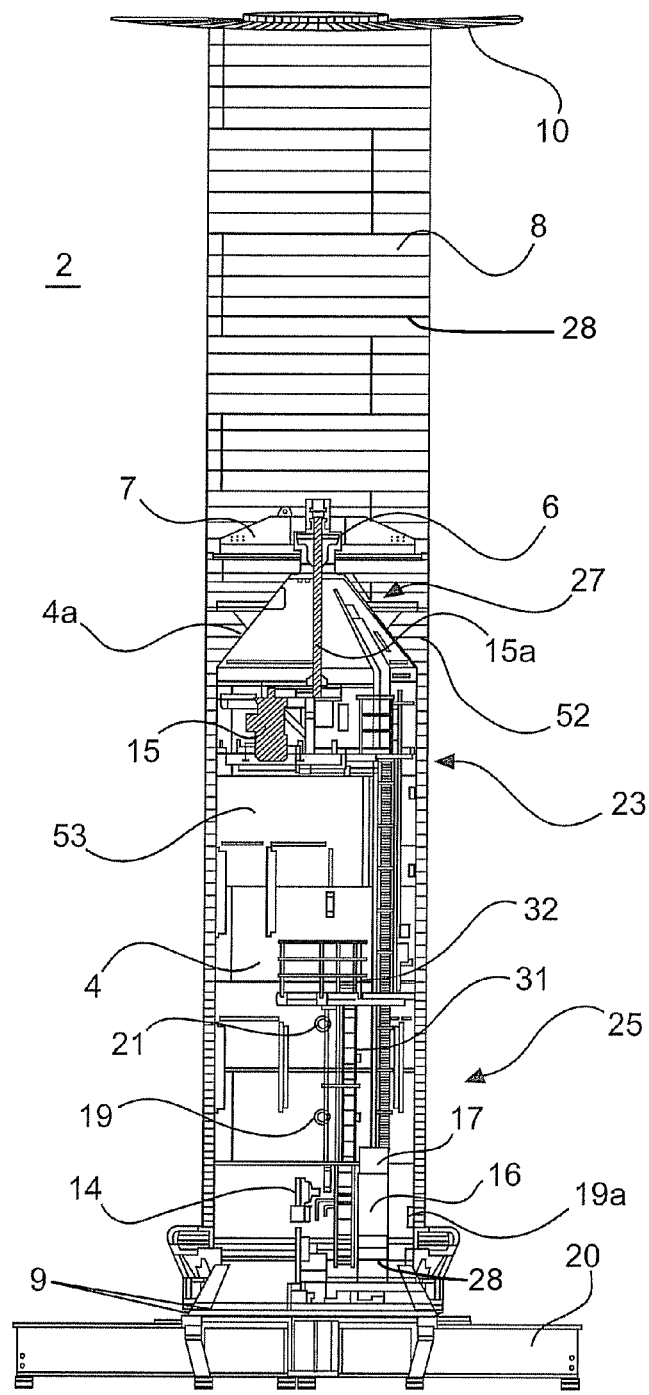
FIG. 3 shows a detailed diagrammatic side view of the Magnus rotor.
Figure 4:
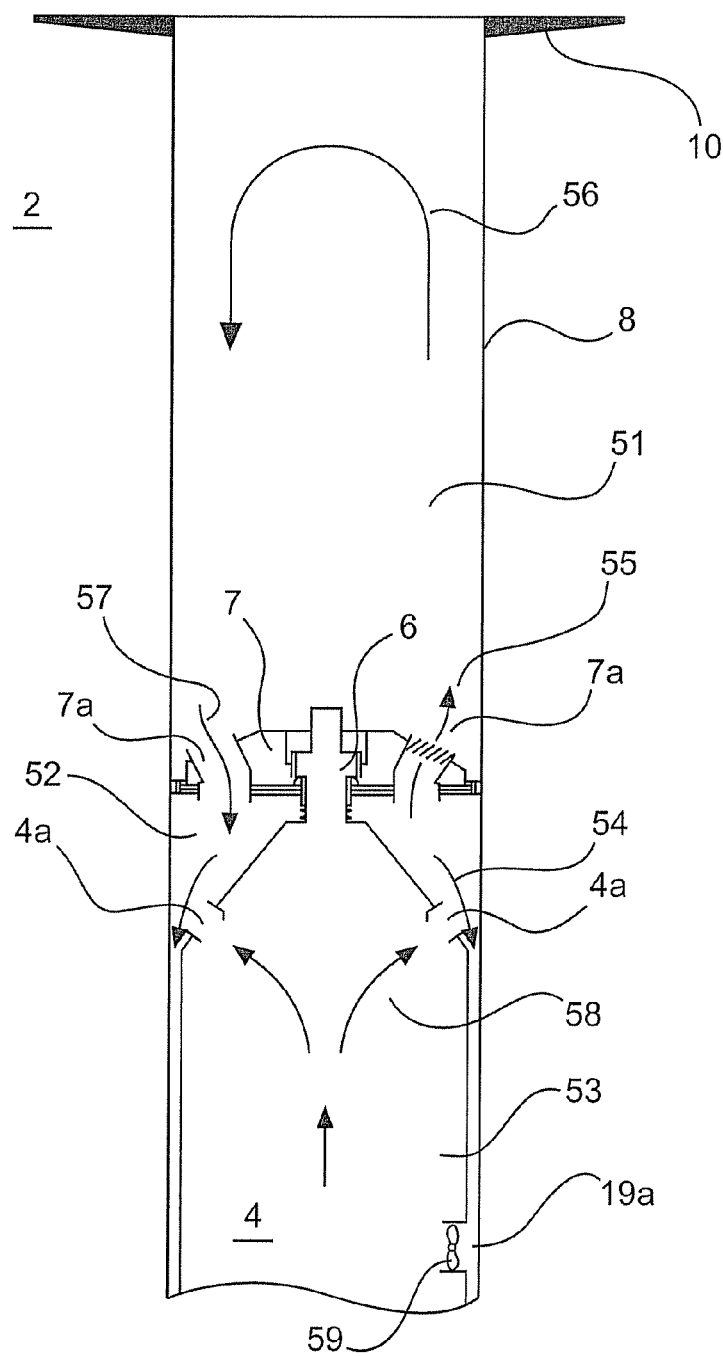
FIG. 4 shows a diagrammatic simplified side view of the Magnus rotor with a hub between carrier and rotary body.

The Magnus rotors 2 are shown in greater detail in FIGS. 2 to 4.

The Magnus rotor 2 in FIG. 2 has an upper rotary body 8 and a lower standing portion as a carrier 4, which are connected together by way of a mounting 6. An end plate 10 is mounted to the rotary body 8 at the upper end thereof. The end plate 10 is removable. It can have openings to permit air to enter the interior of the rotary body 8. The carrier 4 of the Magnus rotor 2 is fixed on a base plate 20 by way of a releasable connection 9. Here (FIG. 2) that releasable connection 9 is in the form of a screw connection. Bolts can also be used. Insofar as the Magnus rotor 2 is mounted for example on the deck of a ship 1 or the like, a corresponding base plate 20 is no longer required for fixing the carrier 4 as the base plate is formed by the deck of the ship or the like itself. The carrier 4 is arranged here (FIG. 2) in the interior of the Magnus rotor 2. The upper rotary body 8 of the Magnus rotor 2 rotates on that carrier 4 by being supported by a mounting 6. That mounting 6 can be a known rolling bearing or any other suitable structure of a bearing.

The openings 4a, 19, 19a, 21 in the carrier can be seen in FIG. 3. Provided in the interior of the Magnus rotor 2 (FIG. 3) are a drive device 15 for driving, that is to say for rotating, the rotary body 8 of the Magnus rotor 2, as well as a control system 16 for controlling the drive device 15 and an inverter 17 for feeding the drive device 15. They are arranged in the interior of the carrier 4. In this case the drive device 15 of the rotary body 8 is arranged in the upper region of the upright carrier 4 so that the drive shaft 15a of the drive device 15 is passed through the mounting 6. An oil pump with oil cooling 14 is arranged within the carrier 4 to lubricate the mounting 6. The upper rotary body 8 is connected to the drive shaft 15a by way of a hub 7. The Magnus rotor 2 is mounted on the base plate 20 or a ship deck or the like by means of bolts or screws 9. The Magnus rotor 2 has the inwardly disposed carrier 4, the mounting 6, the upper rotary body 8 and the end plate 10, as shown in FIG. 2 and described.

The carrier (FIG. 3) further has three openings 19, 19a, 21 in a lower portion 25. They can be reached from a ladder 31 or a service platform 32. The openings 19, 19a, 21 can be closed with a flap, a louvre grill or the like (not shown here). If those openings 19, 19a, 21 are to be used for maintenance purposes, the flap etc. has to be removed. In particular the openings 19, 19a, 21 can be used for fitting weights to the rotary body 8. The weights serve to compensate for a possible imbalance of the rotary body 8. For that purpose the Magnus rotor 2 or the carrier 4 is to be accessed from below or through the base plate 20. The rotary body has cooling ribs 28 on an inner portion of the rotary body as best shown in FIG. 3.

To cool the oil cooling 14, the drive device 15, the control system 16, the inverter 17 or other assemblies, air passes for example through the lower opening 19a into the internal space 53 of the carrier 4. For that purpose the carrier 4 can also have a plurality of lower openings 19a. The air flows along the assemblies 14, 15, 16, 17 and thus cools them by means of convection. The heated air then rises into an upper portion 23 of the carrier 4 where it passes through upper openings 4a into the intermediate space 52. There the air is cooled by means of convection at the rotary body 8 and drops down in the intermediate space 52 in order to pass in a cooled condition into the internal space 53 again through the lower opening 19a. The assemblies 14, 15, 16, and 17 may include cooling ribs 28 as shown on the cooling system 16 in FIG. 3.

The opening through the base plate 20 can additionally be used as a fresh air feed, in an alternative embodiment. Thus it is possible for air to be passed from outside the Magnus rotor 2 through the base plate 20 into the internal space in the carrier 4.

In use of the Magnus rotor 2 on the open seas, salty air flows therearound. As the rotary body 8 does not completely air-tightly cover over the intermediate space 51, 52 (for example by virtue of being guided on the base plate 20 or by virtue of the mounting or maintenance openings in the rotary body 8), sea air can penetrate into the intermediate space 51, 52 and thus also into the internal space 53 in the carrier 4. The entry of that salty air can cause damage on elements within the carrier 4 such as for example the inverters 17 or the control system 16. In addition salty air leads to accelerated corrosion of the carrier 4 which is preferably made from steel. Further parts of the Magnus rotor 2 can also corrode. In this alternative embodiment substantially salt-free fresh air is passed into the internal space 53 in the carrier 4 or an intermediate space 51, 52. It is advantageous for the volume flow of that fresh air to be of such a magnitude that it issues through openings in the Magnus rotor 2 in such a way that salty sea air is substantially displaced and cannot pass into an intermediate space 51, 52 or the internal space 53. For that purpose, an increased pressure can be provided in the intermediate space 51, 52 and/or the internal space 53. In addition filters can be arranged at openings of the Magnus rotor 2 so that incoming salty air can pass into an intermediate space 51, 52 and/or an internal space 53, only in a filtered condition (substantially freed of salt).

At its upper portion 23 the carrier 4 has a conical portion 27. An opening 4a is also arranged in the conical portion 27. Air can pass through the two lower openings 19, 19a, 21 into the internal space in the carrier 4 and there flow around the oil cooler 14, the control system 16, the inverter 17 and the drive device 15 and thus also cool them and then issue from the upper opening 4a. The air cools down in the intermediate space between the rotary body 8, the carrier 4 and the hub 7 and drops down in the intermediate space. There it can pass again into the internal space in the carrier 4.

If the hub 7 also has openings 7a (FIG. 4) the intermediate space is increased in size and the air is more effectively cooled down. In this embodiment (FIG. 4) the air flow is represented by the arrows 54, 55, 56, 57. In this embodiment the air enters the intermediate space 52 not only from the internal space 53 but also enters the intermediate space 51 from the intermediate space 52. That provides for better cooling of the air, with at the same time heating of the rotary body 8. Heating the rotary body 8 is advantageous as a ship 1 which has a Magnus rotor 2 can be used in different climatic zones. Depending on the respective weather conditions ice can be formed on the rotary body 8. Thus it is advantageous to pass the heated air into the rotary body 8 as that heated air heats the rotary body 8 from the inside whereby the ice which is clinging to its outside wall is removed by thawing. Due to that thawing effect an iced-up Magnus rotor 2 can be made operable again as a Magnus rotor 2 on which ice clings to the rotary body 8 thereof from the outside should not be operated. Thus the ice clinging thereto can represent a considerable additional mass which would have to be additionally driven and which reduces the efficiency of the Magnus rotor drive. In addition the ice can cling asymmetrically to the outside wall and thereby produce an imbalance which can adversely affect operation. There is also the risk that in operation clinging ice is detached from the outside wall of the Magnus rotor 2 and is flung away therefrom whereby the surrounding area can be endangered by the flung-off pieces of ice. It is therefore necessary for safety reasons and for restoration of the Magnus rotor operation to provide a possible way of being able to thaw an iced Magnus rotor 2 as quickly as possible.

In this embodiment (FIG. 4) heated air 58 passes through the upper openings 4a out of the internal space 53 and into the intermediate space 52. A part of the air 54 falls down in the intermediate space 52, in a cooled condition. Another part of the air 55 rises through the openings 7a in the hub 7 into the intermediate space 51 where it cools down. The cooled air 56, 57 falls through openings 7a in the hub 7 into the intermediate space 52 in order there to drop down further. The cold air is conveyed by a fan 59 or the like through the lower opening 19a into the internal space 53 in the carrier and is again provided there for cooling the assemblies 14, 15, 16, 17. Fans or the like can be arranged at each opening 4a, 7a, 19, 19a, 21. Thus it is possible for air always to be conveyed in such a way that it circulates as desired in the Magnus rotor 2.

By way of example a louvre grill 11 is also arranged at an opening 7a in the hub 7. It is however also possible for a louvre grill 11 to be arranged in each opening 4a, 7a, 19, 19a, 21. In that case the grill does not necessarily have to be mounted in the opening 4a, 7a, 19, 19a, 21 in flush relationship with the surface, any kind of arrangement in which the air flows substantially through or around the grill 11 is advantageous. The openings 7a can be arranged in the hub in such a way that they advantageously influence the formation of the flow. Thus it is possible, by the choice of a suitable angle, to pass heated air into the intermediate space 51 above the hub in a still more effective manner and to pass cooled air into the intermediate space 52 again in a still more effective manner to feed it to the internal space 53.

Figure 5:
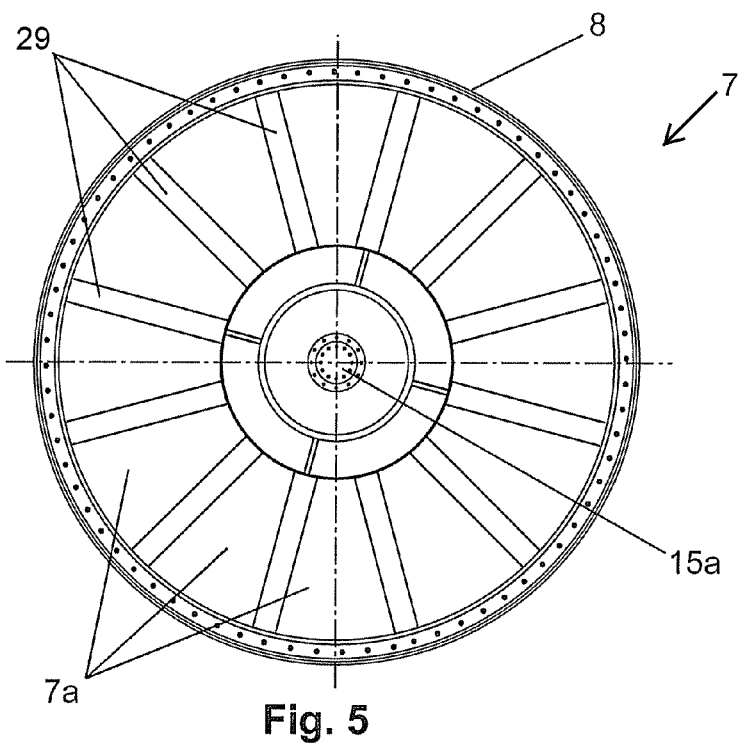
FIG. 5 shows a diagrammatic plan view of the hub of a Magnus rotor.
Figure 6:
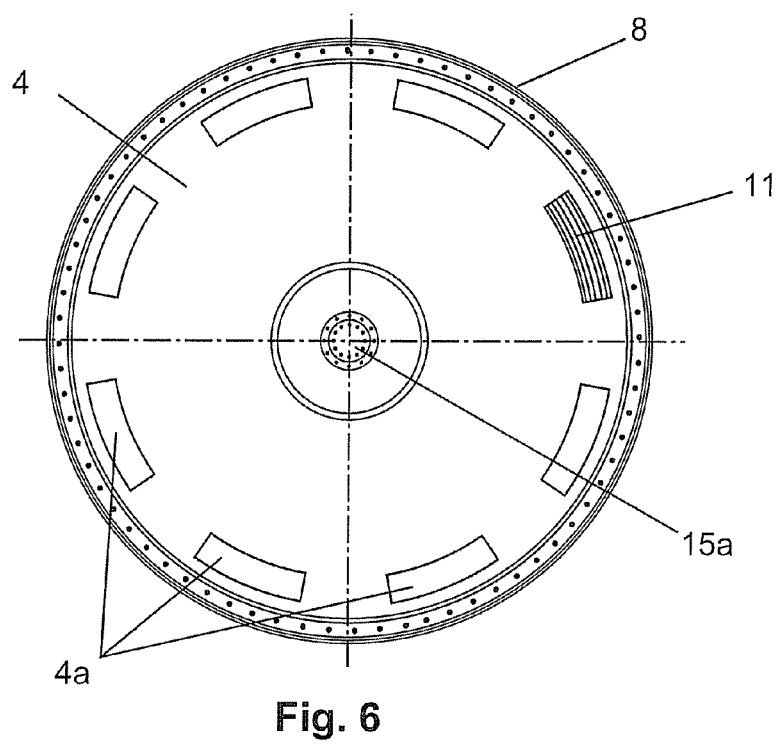
FIG. 6 shows a diagrammatic plan view of the carrier of a Magnus rotor.

In the embodiment illustrated in FIG. 5, the hub 7 is designed in such a way that it connects the outside wall of the rotary body 8 to the drive shaft 15a by way of ribs 29. In that way, the openings 7a are particularly large and a space, which can be almost passed through, is provided in the interior of the rotary body 8 from the top side of the carrier 4 to the end plate 10 of the rotary body 8, in which the heated air can rise almost unimpededly from the carrier openings 4a and in a straight line perpendicularly to the end plate 10. That provides for particularly effective cooling of the air. In that case the ribs 29 can also act like fan blades and thus provide an even more effective flow in the Magnus rotor 2. Equally the openings 4a in the conical portion 27 of the carrier 4 can contribute to effective cooling. In the embodiment (FIG. 6) they are arranged close to the rotary body 8. In that way heated rising air is guided in the direction of the rotary body 8 where it is cooled by convection. For example an opening 4a is provided with a louvre grill 11. Here that grill 11 is so arranged that the heated air is passed towards the rotary body 8 even more strongly.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A Magnus rotor comprising:
a carrier having an upper portion, a lower portion and an internal space, wherein the upper portion is at least partially conically shaped, the carrier having at least one cooling opening arranged in the conically shaped upper portion and at least one cooling opening at the lower portion;
a rotary body rotatably mounted to the carrier at the upper portion of the carrier and enclosing a rotary body internal space, wherein the at least one cooling opening fluidly couples the internal space of the carrier with the rotary body internal space to allow air to pass between the internal space of the carrier and the rotary body internal space; and
a drive device for driving the rotary body.

2. The Magnus rotor according to claim 1 wherein the carrier is arranged substantially within the rotary body and the drive device is arranged substantially within the carrier.

3. The Magnus rotor according to claim 1 further comprising a louvre grill that is arranged proximate the at least one opening.

4. The Magnus rotor according to claim 1 wherein the drive device is an electric drive that is coupled to peripheral devices, and the drive device and peripheral devices are arranged substantially within the internal space of the carrier.

5. The Magnus rotor according to claim 1 wherein at least one of the drive device and peripheral devices have cooling ribs.

6. The Magnus rotor according to claim 1 further comprising a connecting element for rotatably mounting the rotary body to the carrier, and the connecting element having at least one opening connecting an intermediate space to a space above the connecting element in such a way that air can pass there between.

7. The Magnus rotor according to claim 1 wherein the rotary body has cooling ribs on an inner portion.

8. The Magnus rotor according to claim 1 wherein the Magnus rotor has means for producing a flow through the at least one opening.

9. The Magnus rotor according to claim 1 wherein the carrier is located substantially inside the rotor body, and the external space is located inside the rotor body.

10. A method of cooling elements of a Magnus rotor, wherein the Magnus rotor has a carrier and a rotary body rotatably mounted to the carrier and enclosing a rotary body internal space, the method comprising:
introducing air into an internal space of a carrier by causing the air to flow through a plurality of openings arranged in a first portion of the carrier;
causing the air to flow over the elements thereby heating the air while convection cooling the elements located in the internal space of the carrier;
causing the heated air to exit through the plurality of openings arranged in a second, upper portion of the carrier and go into the rotary body internal space of the rotary body; and
cooling the heated air in the rotary body internal space.

11. The method according to claim 10 wherein the space external the carrier is a space located within the rotary body.

12. A method of heating a rotary body of a Magnus rotor, wherein the Magnus rotor has a carrier having an internal space, the rotary body being rotatably mounted to the carrier and enclosing a rotary body internal space, the method comprising:
heating air located in the internal space of the carrier by convection cooling elements in the internal space of the carrier;
causing the heated air to flow through a plurality of openings between the internal space of the carrier to the rotary body internal space of the rotary body; and
using the heated air to heat the rotary body.

13. A ship comprising:
a Magnus rotor including:
a carrier having an internal space, the carrier having at least one opening that connects the internal space of the carrier with an external space such that air passes between the internal space and the external space;
a rotary body rotatably mounted to an upper portion of the carrier;
a hub located in the external space over the carrier, the hub coupling the rotary body to a drive shaft, the hub having at least one opening; and
a drive device for driving the rotary body, wherein the drive device is an electric drive that is coupled to peripheral devices, and wherein the drive device and peripheral devices are arranged substantially within the internal space of the carrier.

14. The ship according to claim 13 wherein the external space is located inside the rotary body.

15. The ship according to claim 13 wherein the carrier includes a plurality of openings that connect the internal space of the carrier with the external space.

* * * * *